US006973119B2

(12) United States Patent
Yotsumoto

(10) Patent No.: US 6,973,119 B2
(45) Date of Patent: Dec. 6, 2005

(54) METHOD AND APPARATUS FOR RECOGNIZING A RECEIVING PATH IN A CDMA SYSTEM

(75) Inventor: Koji Yotsumoto, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 763 days.

(21) Appl. No.: 09/756,673

(22) Filed: Jan. 10, 2001

(65) Prior Publication Data

US 2001/0022807 A1 Sep. 20, 2001

(30) Foreign Application Priority Data

Jan. 13, 2000 (JP) .............................. 2000-004317

(51) Int. Cl.[7] .......................... H04B 1/69; H04B 1/707; H04B 1/713
(52) U.S. Cl. ...................... 375/147; 370/320; 370/335; 398/78; 375/130; 375/136; 375/150; 375/142
(58) Field of Search ................................ 375/147, 343, 375/357, 363, 371

(56) References Cited

U.S. PATENT DOCUMENTS

| | | | | |
|---|---|---|---|---|
| 5,347,536 A | * | 9/1994 | Meehan ........................ 375/148 |
| 5,815,798 A | * | 9/1998 | Bhagalia et al. ........... 455/13.4 |
| 5,854,815 A | * | 12/1998 | Lennen ......................... 375/343 |
| 6,031,882 A | * | 2/2000 | Enge et al. .................. 375/343 |
| 6,137,824 A | * | 10/2000 | Liu .............................. 375/130 |
| 6,229,842 B1 | * | 5/2001 | Schulist et al. ............. 375/148 |
| 6,233,272 B1 | * | 5/2001 | Yugawa ....................... 375/148 |
| 6,313,786 B1 | * | 11/2001 | Sheynblat et al. ...... 342/357.02 |
| 6,510,143 B1 | * | 1/2003 | Bejjani et al. .............. 370/320 |
| 6,522,706 B1 | * | 2/2003 | Bahai et al. ................. 375/343 |
| 6,553,059 B1 | * | 4/2003 | Ito .............................. 375/150 |
| 6,628,700 B1 | * | 9/2003 | Miura ......................... 375/148 |

* cited by examiner

*Primary Examiner*—Stephen Chin
*Assistant Examiner*—Harry Vartanian
(74) *Attorney, Agent, or Firm*—Pillsbury Winthrop Shaw Pittman LLP

(57) ABSTRACT

A method and system are provided for recognizing a path having low level signals, which is conventionally treated as useless, as a valid receiving path. Recognition is made from a plurality of receiving paths in a CDMA wireless telecommunication system by receiving at least one set of signals through a transmission path, generating at least two spread codes each with its own delay time, and calculating at least two correlation values of the set of signals with the spread codes. A CDMA wireless telecommunication mobile station is also provided for receiving a set of telecommunication signals through a telecommunication path from a base station. At least two spread codes are generated, each with its own delay time and a predetermined number of spread code bits. At least two correlation values of the set of signals are calculated with the spread codes.

26 Claims, 12 Drawing Sheets

METHOD AND APPARATUS FOR RECOGNIZING A RECEIVING PATH IN A CDMA SYSTEM

This patent application claims priority based on a Japanese patent application, 2000-4317, filed on Jan. 13, 2000, the contents of which are incorporated herein by reference.

BACKGROUND OF THE INVENTION

The present invention relates to a method for recognizing a valid receiving path for demodulating received signals transmitted through a plurality of transmission paths in a CDMA (Code Division Multiple Access) wireless telecommunication system. More specifically, the invention is directed to a method for recognizing a valid receiving path for demodulating received signals based on a distortion of a correlation profile expressed by, for example, a delay profile acquired out of correlation values, and to a mobile station which embodies the method.

FIG. 1 is a block diagram showing an example of a conventional base band signal processor 10 of a CDMA mobile station. The base band signal processor 10 includes a spread code generator 12, a correlator 14, a memory 16, a comparator 18 and registers 20 and 22. The register 20 stores a predetermined path recognition threshold value, and the register 22 stores a predetermined noise threshold value.

The spread code generator 12 generates a plurality of phase-shifted spread codes, each of which is comprised of a predetermined number of spread code bits. The correlator 14 acquires a correlation value by determining correlation between a set of received signals and a spread code. In a specific receiving path through which a specific set of signals is transmitted, there may be a plurality of correlation values acquired by determining correlations of the set of received signals and a plurality of spread codes. The memory 16 stores the correlation values of several receiving paths thus acquired by the correlator 14. The comparator 18 determines whether a specific set of received signals of a specific path is noise or not by comparing the correlation values for that set of received signals with the noise threshold value. The comparator 18 also compares a peak correlation value out of the correlation values for that set of received signals with the path recognition threshold value. The path of which the peak correlation value is larger than the path recognition threshold value is recognized as a valid receiving path for demodulation, and the location of the peak correlation value is stored as a path location for the receiving path in the memory 16.

FIG. 2 is a flowchart of a conventional path recognizing process performed by the conventional base band signal processor 10. At step S10, the path recognizing process starts. At step S12, the correlation values of a set of received signals through a specific path with spread codes are acquired. At step S14, the correlation values are stored into the memory 16, so that each of the correlation values are compared with the noise threshold value at steps 16. If one of the correlation values is smaller than the noise threshold value, the set of signals having that correlation value at that delay time is recognized as noise at step S20. If all of the correlation values are larger than the noise threshold value, a peak correlation value out of the correlation values of the path is compared with the path recognition threshold value at step S18.

If the peak correlation value is smaller than the path recognition threshold value, the set of signals having that peak correlation value at that delay time is recognized as noise at step S20. If the peak correlation value is larger than the path recognition threshold value, the path having that peak value is recognized as a valid receiving path for demodulation, and the level and the delay time of the peak correlation value are stored into the memory 16 at step S22. At step S24 the process terminates.

However, some known negative phenomena, such as Fading or Doppler effect, generally deteriorate transmission paths so that the transmission paths may be influenced by interference signals and noises. In this case, the peak correlation value of a deteriorated path is prone to be smaller than the path recognition threshold value designed for a conventional path recognition process as described above. This results in less of the path having that peak value because the path could not be recognized as a valid receiving path for demodulating signals. Therefore, in an area of weak radiation field, it is generally impossible to recognize a valid receiving path for demodulation and to establish a reliable telecommunication link.

Further, a mobile station, which receives signals intermittently, may enter into a "sleep mode" for battery saving purpose, and the circuitry of the mobile station in the sleep mode is in standby state. In this case, if the mobile station can not recognize a valid receiving path, the mobile station must recover from the sleep mode and search for a valid receiving path. This results in increase of power consumption and decreases the duration of the battery.

The difficulties and limitations suggested in the preceding are not intended to be exhaustive, but rather are among many which demonstrate that prior art CDMA wireless telecommunication systems of the type described herein will admit to worthwhile improvement.

OBJECTS OF THE INVENTION

It is therefore a general object of the invention to provide an improved method and CDMA mobile station thereof which will obviate or minimize difficulties of the type previously described.

It is a specific object of the present invention to provide a method and a system for recognizing a valid receiving path which make it possible to recognize a path, having low level signals, which conventionally is treated as useless, as one of the valid receiving paths.

SUMMARY OF THE INVENTION

To achieve the foregoing objects, the present invention provides a method for recognizing a valid receiving path for demodulating received signals out of a plurality of receiving paths in a CDMA wireless telecommunication system including the steps of: receiving at least one set of signals through a transmission path, the set of signals being comprised of a predetermined number of received signals; generating at least two spread codes each of which has its own delay time, the spread codes being comprised of a predetermined number of spread code bits; calculating at least two correlation values of the set of signals with the at least two spread codes; and recognizing the path as a valid receiving path for demodulating the received signals based on the at least two correlation values.

The present invention further provides a CDMA wireless telecommunication mobile station for receiving a set of telecommunication signals through a telecommunication path from a base station including: a spread code generator for generating at least two spread codes each of which has its own delay time, the spread codes being comprised of a predetermined number of spread code bits; a correlator for calculating at least two correlation values of the set of signals with the at least two spread codes; and a path recognizing unit for recognizing the path as a valid receiving path for demodulating the received signals based on the at least two correlation values.

BRIEF DESCRIPTION OF THE DRAWINGS

Other objects and advantages of the present invention will become apparent from the following detailed description of prepared embodiments thereof taken in conjunction with the accompanying drawings, wherein.

DETAILED DESCRIPTION OF THE INVENTION

Figure 1:
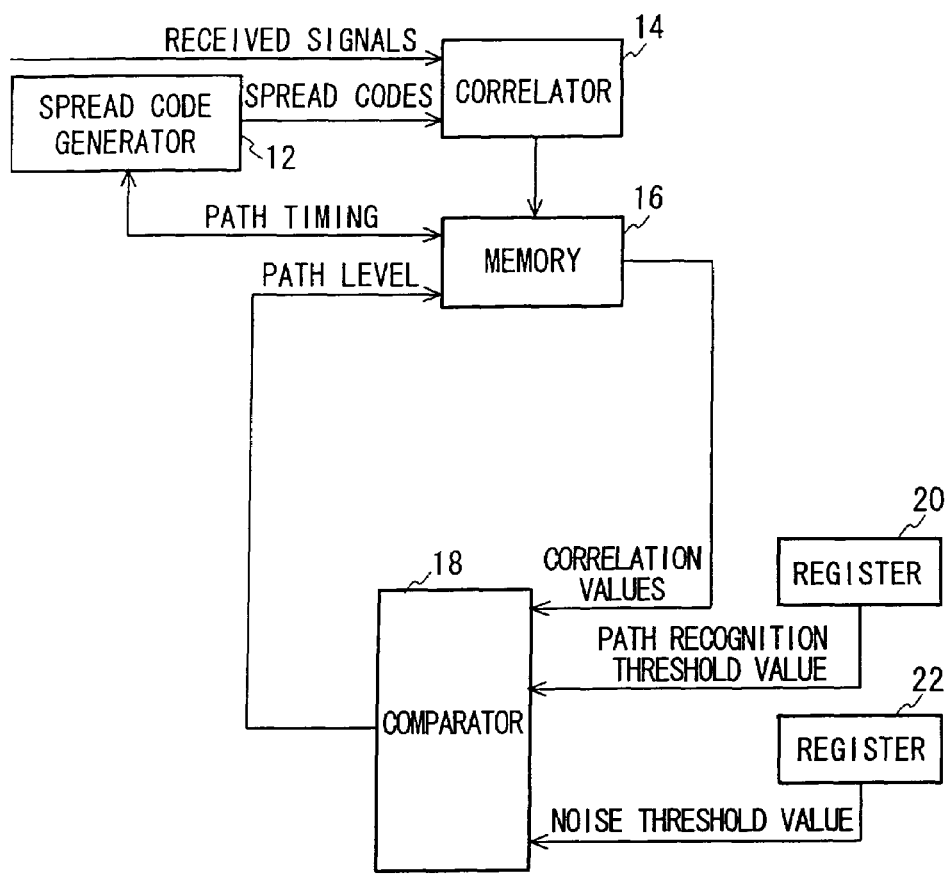
FIG. 1 is a block diagram showing an example of a conventional base band signal processor of a CDMA mobile station.
Figure 2:
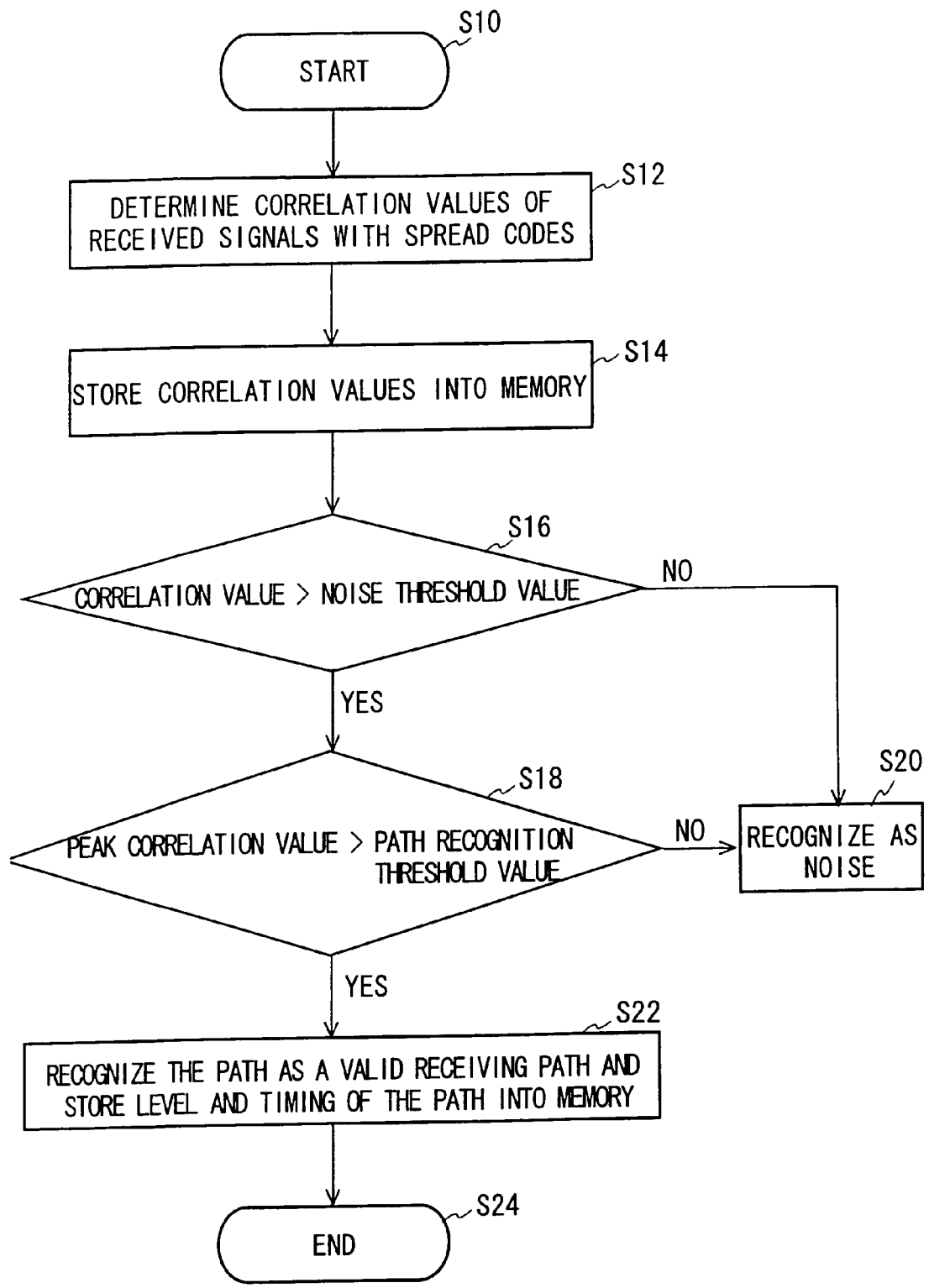
FIG. 2 is a flowchart of a conventional path recognizing process performed by the conventional base band signal processor of FIG. 1.
Figure 3:
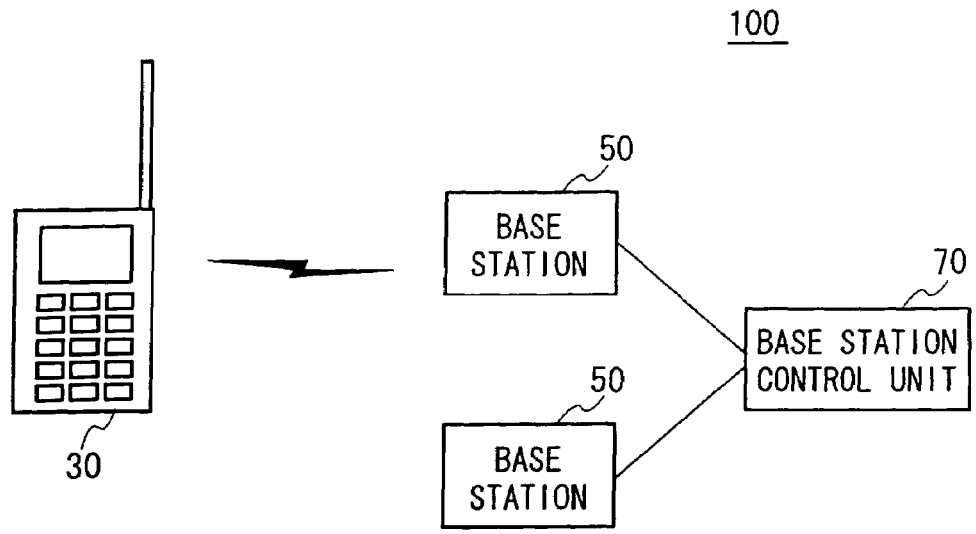
FIG. 3 is a schematic block diagram showing a CDMA telecommunication system according to the present invention.

FIG. 3 is a schematic block diagram showing a CDMA telecommunication system 100 according to the present invention. The CDMA telecommunication system 100 includes a mobile station 30, a base station 50 and a base station control unit 70. The base station control unit 70 may control one or more of base stations. The base station 50 and the base station control unit 70 may be coupled by wired communication link. A wireless communication link is established between the base station 50 and the mobile station 30.

Figure 4:
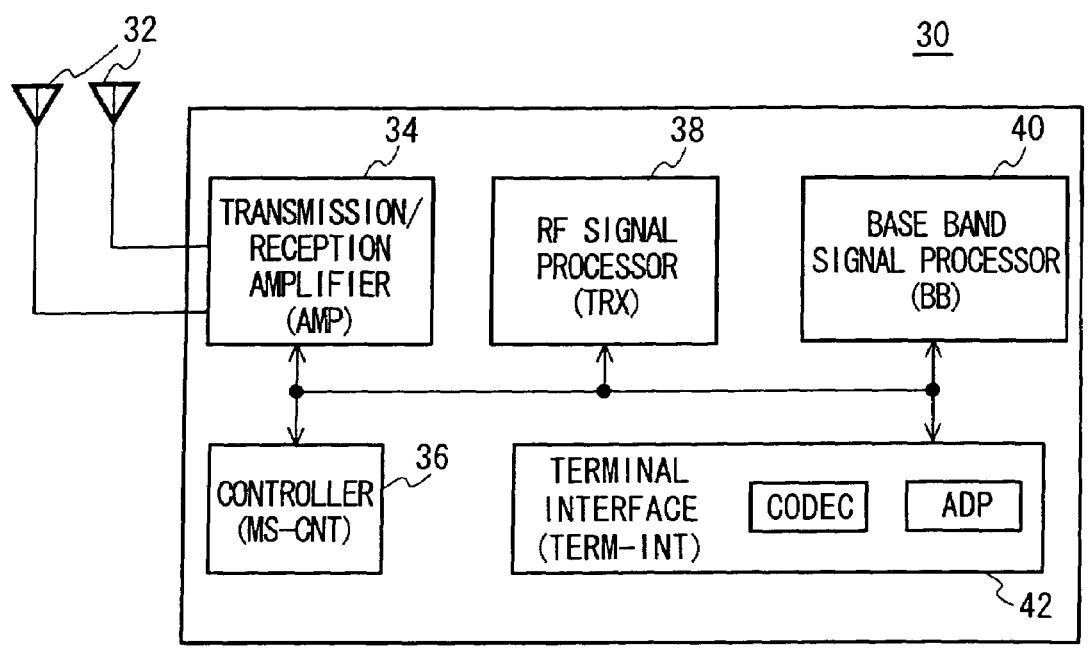
FIG. 4 is a block diagram showing an example of a structure of the mobile station.

FIG. 4 is a block diagram showing an example of a structure of the mobile station 30. The mobile station 30 includes a transceiver 32, which transmits or receives telecommunication signals, a transmission/reception amplifier 34, a controller 36, an RF signal processor 38, a base band signal processor 40 and a terminal interface unit 42. The transceiver 32 may include an antenna or antennae. The transceiver 32 transmits reverse-link RF signals amplified by the transmission amplifier and receives high bandwidth forward-link RF signals from the base station 50. The transmission/reception amplifier 34 includes a transmission amplifier (or High Power Amplifier: HPA), which amplifies RF transmission signals, and a low noise amplifier (LNA) that amplifies RF received signals. Further, the transmission/reception amplifier 34 separates RF transmission signals from RF received signals or vice versa. The RF signal processor 38 performs orthogonal modulation and D/A converting on the base band transmission signals spread by the base band signal processor 40 finally resulting in RF transmission signals. The RF signal processor 38 further performs quasi-synchronized wave detection and A/D converting on the received signals from the transmission/reception amplifier 34, and sends converted signals to the base band signal processor 40.

The base band signal processor 40 performs a base band signal processing on the transmission or received signals. In other words, the base band signal processor 40 performs on transmission signals the processing of error correction encoding, frame encoding, data modulation and spread modulation, and then sends the processed signals to the RF signal processor 38. The base band signal processor 40 performs on the received signals sent from the RF signal processor 38 the processing of reverse-spreading, path recognition, chip synchronizing, error correction decoding, data multi-separation, diversity handover composition, etc. According to the present invention, even under a poor transmission path environment, the base band signal processor 40 is able to recognize a valid receiving path for demodulating received signals. The controller 36 has control functions such as sending and receiving control signals. The terminal interface unit 42 facilitates the functions of voice CODEC and Data Adapter (ADP) so that it facilitates an interface function for a handset and an external data terminal.

Figure 5:
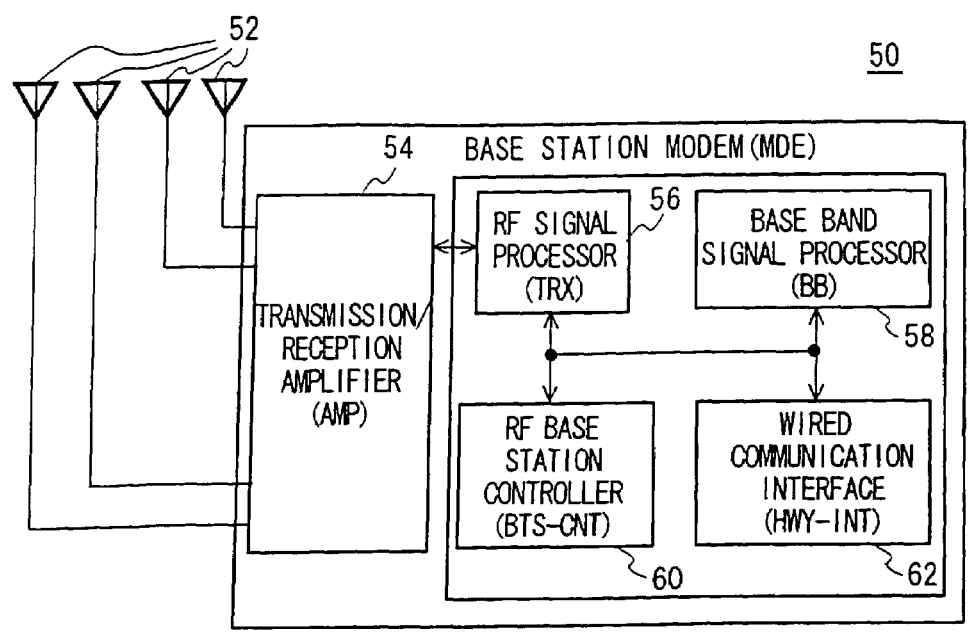
FIG. 5 is a block diagram showing a functional structure of a base transceiver system (BTS) of the base station.

FIG. 5 is a block diagram showing a functional structure of a base transceiver system (BTS) of the base station 50. The base station 50 includes a transceiver 52, which transmits or receives telecommunication signals, a transmission/reception amplifier 54, an RF signal processor 56, a base band signal processor 58, an RF base station controller 60 and a wired communication interface unit 62. The transceiver 52 may also include an antenna or antennae. The transceiver 52 transmits forward-link RF signals amplified by the transmission amplifier, and receives reverse-link RF signals transmitted from the mobile station 30. The transmission/reception amplifier 54 includes a transmission amplifier, which amplifies RF transmission signals, and a low noise amplifier (LNA) that amplifies RF received signals. Further, the transmission/reception amplifier 54 separates RF transmission signals from RF received signals or vice versa. The RF signal processor 56 performs orthogonal modulation and D/A converting on the base band transmission signals spread by the base band signal processor 58 finally resulting in RF transmission signals. The RF signal processor 56 further performs quasi-synchronized wave detection and A/D converting on the received signals from the transmission/reception amplifier 54, and sends converted signals to the base band signal processor 58.

The base band signal processor 58 performs a base band signal processing on the transmission or received signals. In other words, the base band signal processor 58 performs on transmission signals the processing of error correction encoding, frame encoding, data modulation and spread modulation, and then sends the processed signals to the RF signal processor 56. The base band signal processor 58 performs on the received signals sent from the RF signal processor 56 the processing of reverse spreading, chip synchronizing, error correction decoding, data multi-separation, maximum ratio composition of inter-sector diversity handover, etc. The controller 60 has control functions such as sending and receiving control signals to perform RF link establishment, RF link management, etc. The wired communication interface unit 62 facilitates an interface among the BTS, MCC-SIM (not shown) of the base station 50 and the base station control unit 70 (see FIG. 3).

Figure 6:
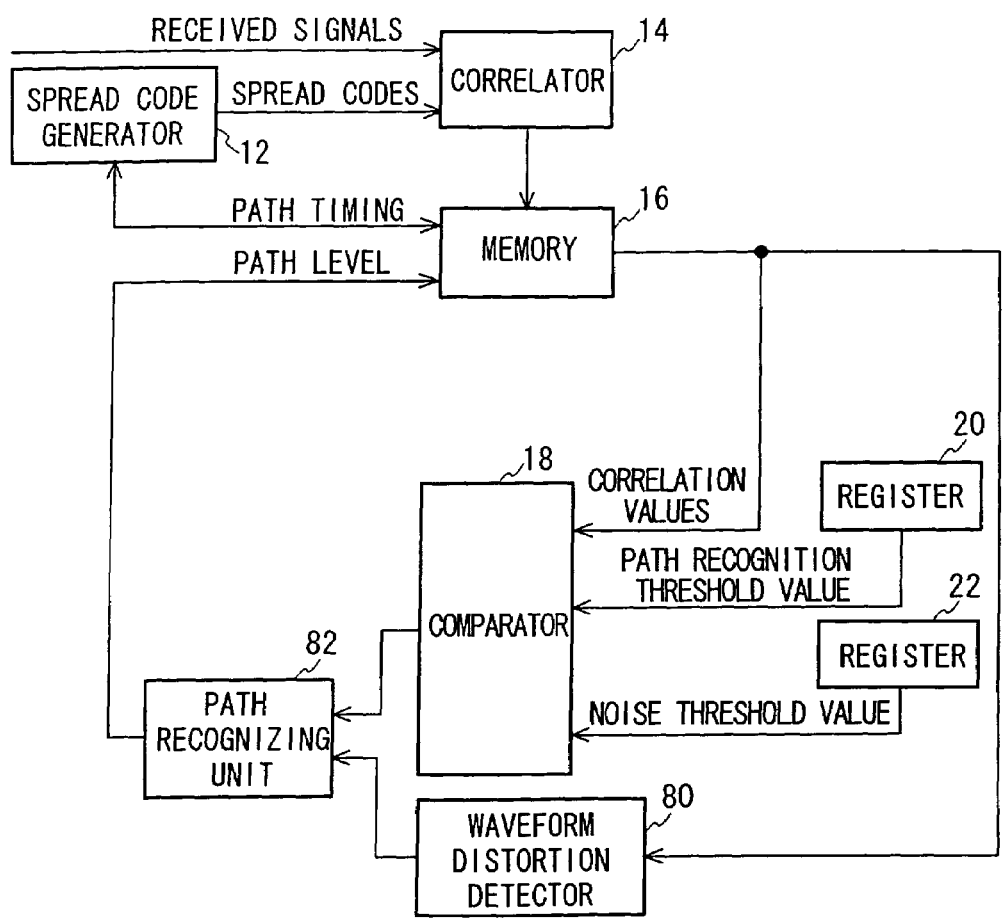
FIG. 6 is a schematic block diagram showing an embodiment of the base band signal processor of the mobile station according to the present invention.

FIG. 6 is a schematic block diagram showing an embodiment of the base band signal processor 40 of the mobile station 30 according to the present invention. According to this embodiment, the base band signal processor 40 includes a spread code generator 12, a correlator 14, a memory 16, a comparator 18, registers 20 and 22, a waveform distortion detector 80 and a path recognizing unit 82. The register 20 stores a predetermined path recognition threshold value, and the register 22 stores a predetermined noise threshold value.

The spread code generator 12 generates a plurality of phase-shifted spread codes each of which is comprised of a predetermined number of spread code bits, and provides the generated codes to the correlator 14. The correlator 14 includes, for example a matched filter and a sliding correlator, and acquires correlation values by determining correlations of received signals with the spread codes. The correlator 14 acquires a correlation profile (a multi-path profile), such as a delay profile, based on the correlation values. The memory 16 stores the plurality of correlation values acquired by the correlator 14. The comparator 18 determines whether a set of received signal is noise or not by comparing the correlation values with the noise threshold value. The comparator 18 also compares a peak correlation value of the path with the path recognition threshold value. A path of which the peak correlation value is larger than the path recognition threshold value is recognized as a candidate for a valid receiving path for demodulating received signals through the path, and the location of the peak correlation value is stored as a path location for the receiving path in the memory 16.

The waveform distortion detector 80 determines whether there is a distortion on a path waveform of a particular receiving path, where the path waveform is represented as a correlation profile, such as an impulse response or a delay profile. Otherwise, the waveform distortion detector 80 may detect a distortion on a path waveform based on a frequency transfer function or frequency characteristics, which can be acquired by performing Fourier Transformation on the path waveform represented as a noise response or a delay profile.

It is quite frequent that the path waveform of a receiving path represented as a correlation profile, such as a delay profile, is distorted by the effects of the multi-path fading, interferences between signals, noises, etc. For example, since levels of received signals are generally low in the area having weak field strengths, the peak correlation value of the received signals can be smaller than the path recognition threshold value even though the receiving path through which the signals are transmitted was actually valid for demodulation. According to the present embodiment of the present invention, the waveform distortion detector 80 determines whether a path waveform of a correlation profile is distorted or not based on at least two correlation values. The path recognizing unit 82 recognizes at least one receiving path as a valid receiving path among a plurality of receiving paths through which signals are transmitted based on the comparison result of the comparator 18 and the determination result of the waveform distortion detector 80. The memory 16 stores the levels and a delay timing of the valid receiving path.

Figure 7A:
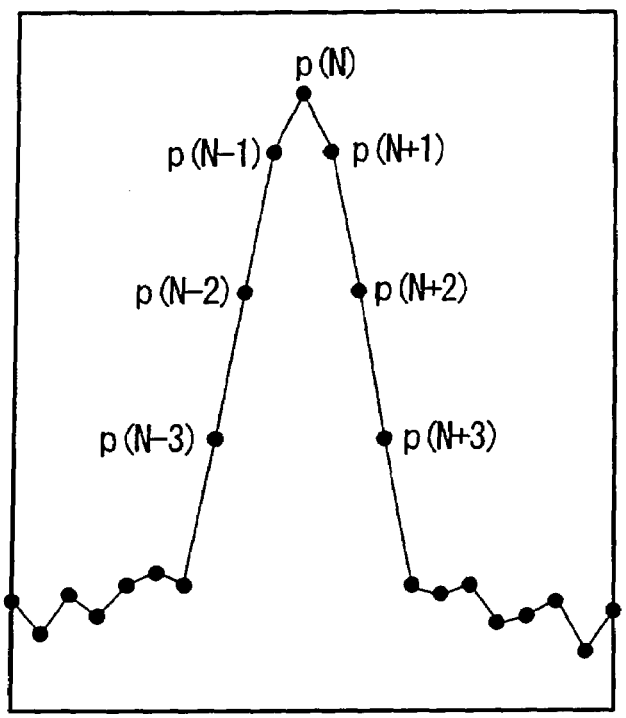
FIGS. 7(a) and 7(b) show graphs of path waveforms of receiving paths represented by impulse responses or delay profiles.
Figure 7B:
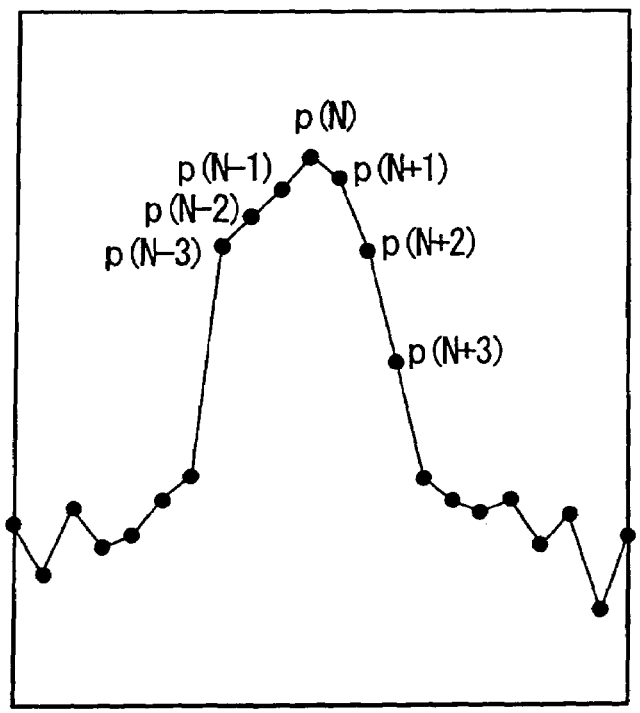

FIGS. 7(*a*) and 7(*b*) show diagrams of path waveforms of receiving paths represented by impulse responses or delay profiles. FIG. 7(*a*) shows an example of a path waveform to which no distortion has occurred. As shown, this undistorted path waveform is sharp and symmetrically wedge-shaped and centered by the point p(N).

FIG. 7(*b*) shows an example of a path waveform to which a distortion has occurred. As shown, this distorted path waveform is of an unsymmetrical and relatively slowly sloped wedge compared to that shown in FIG. 7(*a*). This slow slope of the path waveform is due to the effect of interferences or noises. The waveform distortion detector 80 detects the existence of the distortion by, for example, calculating slopes among correlation points.

Figure 8:
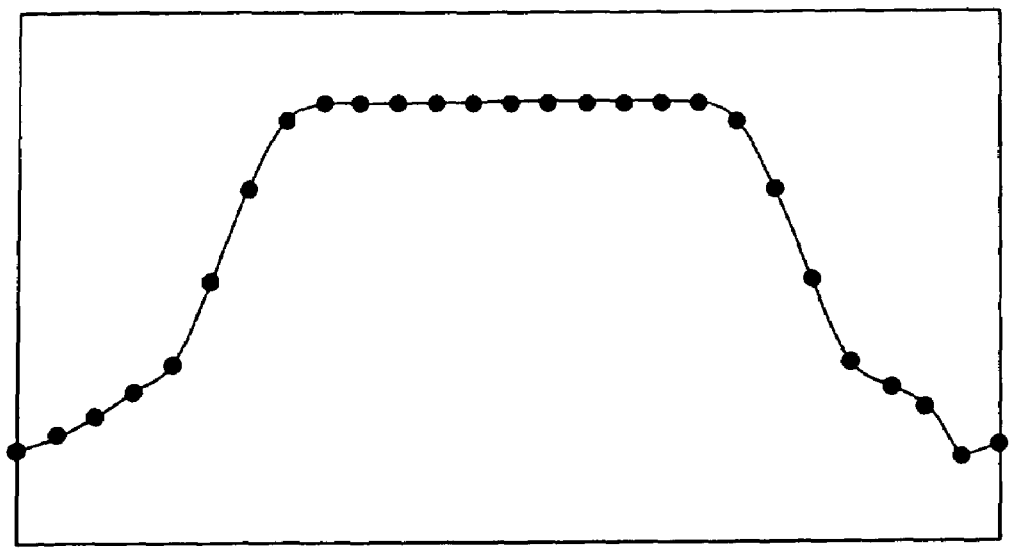
FIGS. 8(a) and 8(b) show graphs of frequency transfer functions or frequency characteristics acquired by performing Fourier Transformation on correlation profile waveforms.
Figure 8:
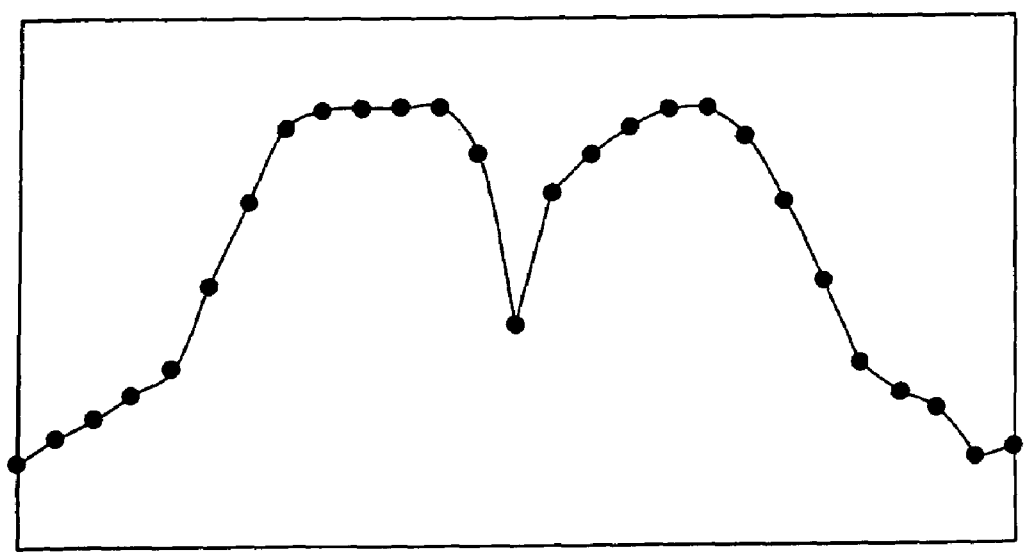

FIGS. 8(*a*) and 8(*b*) show graphs of frequency transfer functions or frequency characteristics acquired by performing Fourier Transformation on correlation profile waveforms, such as delay profile waveforms. FIG. 8(*a*) shows a frequency characteristic of an undistorted path waveform. As shown, in case distortion has not occurred, the frequency spectrum has a shape of plane table.

FIG. 8(*b*) shows a frequency characteristic of a distorted path waveform. Compared to FIG. 8(*a*), this frequency characteristic has a very steep valley. This valley is also due to the effect of interferences or noises. The waveform distortion detector 80 may also detect the existence of distortion on the correlation profile waveform by, for example, calculating slopes between sample points of the frequency characteristic.

Figure 9:
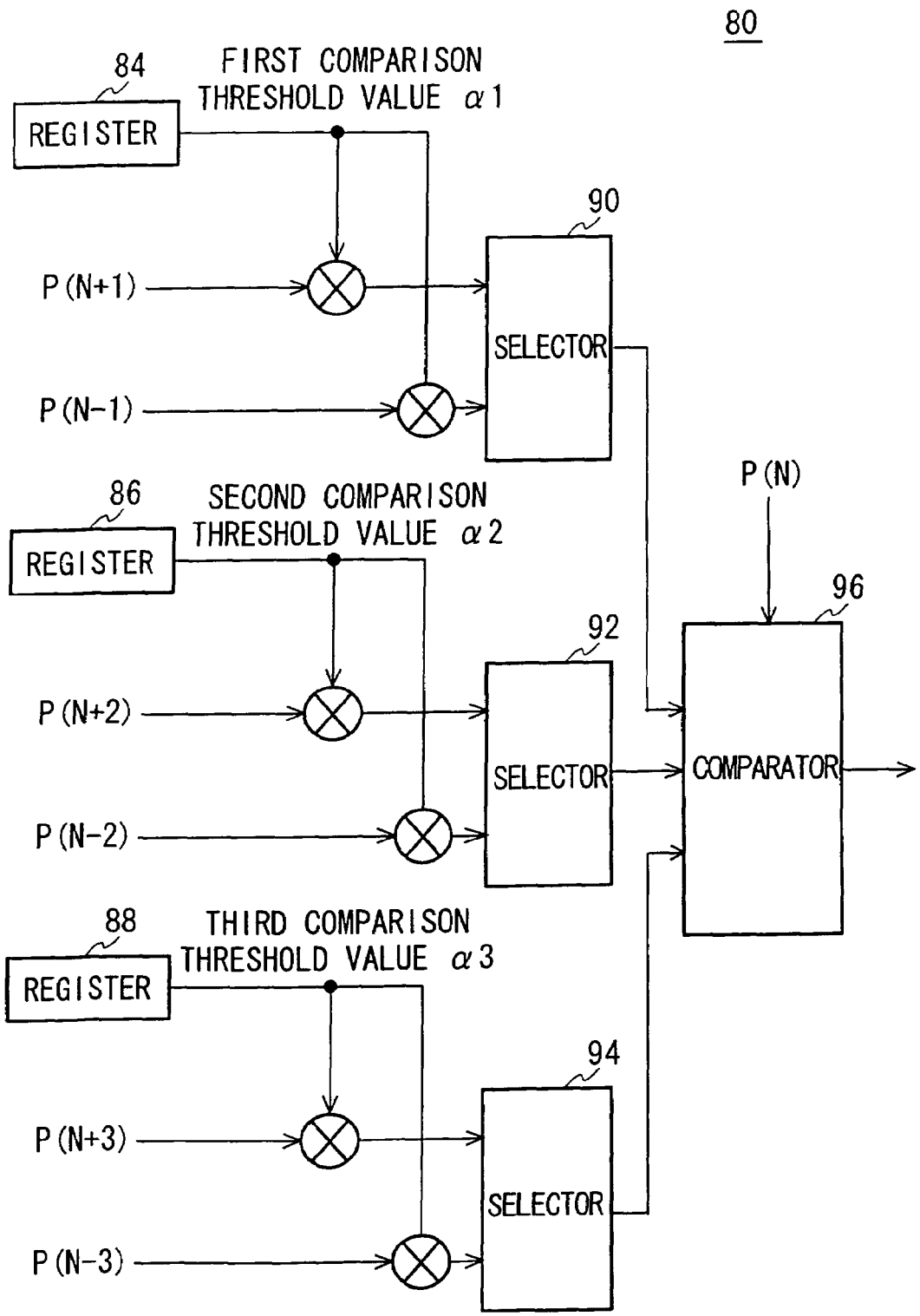
FIG. 9 is a block diagram of an embodiment of the waveform distortion detector 80 of the present invention.

FIG. 9 is a block diagram of an embodiment of the waveform distortion detector 80 of the present invention. The waveform distortion detector 80 includes registers 84, 86 and 88, selectors 90, 92 and 94 and a comparator 96. The waveform distortion detector 80 of the present embodiment determines whether there is any distortion on a path waveform of a correlation profile by evaluating slopes of the waveform.

Again referring to FIG. 7, a correlation value at a specific delay time is expressed as p(k) in a correlation profile. At two points a and b, where b>a, a slope between the two points a and b is given by;

$$\text{(slope between points } a \text{ and } b) = [p(b) - p(a)]/(b-a) \quad (1)$$

Here, let $\beta$ be the ratio of p(b) to p(a). That is, $$p(b) = p(a) \times \beta \quad (2)$$

where p(b)>p(a).

By using equations (1) and (2), we can get $$(b-a) \times \text{(slope between points } a \text{ and } b) = (\beta - 1) \times p(a) \quad (3)$$

More detailed description of the distortion detecting operation of the waveform distortion detector 80 of the present invention is given hereinafter using the above equations.

As mentioned before, according to the present invention, in order to recognize a receiving path as a valid path for demodulating received signals, the shape of the path waveform represented as a correlation profile, such as impulse response or delay profile, is made, and if the shape of the path waveform is not as sharp as that of an undistorted path waveform, it is determined that a distortion is present. As for a test for determining the sharpness of a waveform, a predetermined comparison threshold value is used for being compared with a ratio of a sample point to another. In other words, if a waveform is sharp, the relation between the comparison threshold value and the ratio β of a sample point p(b) to another point p(a) is;

$$\beta >= \text{(comparison threshold value)} \quad (4)$$

The comparison threshold value may have different values depending on sample points.

By using equations (2) and (4), we can get $$p(b) >= p(a) \times \text{(comparison threshold value)} \quad (5)$$

According to the present embodiment, if the equation (5) is true for any of two sample points of a receiving path, the receiving path is recognized as a valid receiving path for demodulation and later used, for example, for RAKE receiving operation.

Again referring to FIG. 9, the register 84 stores a first comparison threshold value α1, the register 86 stores a second comparison threshold value α2, and the register 88 stores a third comparison threshold value α3. The first comparison threshold value α1 is compared to each of the ratios of p(N) to p(N+1) and p(N−1). The second comparison threshold value α2 is compared to each of the ratios of p(N) to p(N+2) and p(N−2), and the third comparison threshold value α3 is compared to each of the ratios of p(N) to p(N+3) and p(N−3). Among the comparison threshold values, it is preferable to have the relation of α1<α2<α3. According to the present embodiment, a distortion on a path waveform is detected by using the largest one from the set consisting of p(N+m) and p(N−m). The slowest slope from the peak p(N) is acquired by using the largest one from the set consisting of p(N+m) and p(N−m). Then, a distortion on the path waveform is detected by using the equation (5).

The first comparison threshold value α1 is multiplied to p(N+1) and p(N−1). The selector 90 selects the largest one from the products of α1 and p(N+1) and α1 and p(N−1), and then provides it to the comparator 96. The comparator 96 compares p(N) with the selected product of α1 and p(N+1) or α1 and p(N−1) by the selector 90.

Similarly, the second comparison threshold value α2 is multiplied to p(N+2) and p(N−2). The selector 92 selects the largest one from the products of α2 and p(N+2) and α2 and p(N−2), and then provides it to the comparator 96. The comparator 96 compares p(N) with the selected product of α2 and p(N+2) or α2 and p(N−2) by the selector 92. Further, the third comparison threshold value α3 is multiplied to p(N+3) and p(N−3). The selector 94 selects the largest one from the products of α3 and p(N+3) and α3 and p(N−3), and then provides it to the comparator 96. The comparator 96 compares p(N) with the selected product of α3 and p(N+3) or α3 and p(N−3) by the selector 94.

The comparator 96 compares p(N) with each of the products provided by the selectors 90, 92 and 94. If p(N) is equal to or larger than at least one of the products provided by the selectors 90, 92 and 94, the waveform distortion detector 80 determines that there is no distortion in the path waveform of this receiving path. Inequalities used for determining a distortion on the path waveform are as follows;

$$p(N) >= \text{MAX}[p(N+1), p(N-1)] \times \alpha1 \quad (6)$$

$$p(N) >= \text{MAX}[p(N+2), p(N-2)] \times \alpha2 \quad (7)$$

$$p(N) >= \text{MAX}[p(N+3), p(N-3)] \times \alpha3 \quad (8)$$

Here, MAX[x, y] is a function having a value of the largest one from the values of x and y. In this case, the largest one from the values of p(N+m) and p(N−m) is used for detecting a distortion in a path waveform, and it is determined whether the distortion has occurred on the slow slope side of the correlation profile.

According to the present embodiment, if at least one of the inequalities (6), (7) and (8) is satisfied, it is determined that no distortion has occurred to the receiving path having a peak correlation value of p(N). If, however, any one of the inequalities (6), (7) or (8) is not satisfied, it is determined that a distortion has occurred to the path waveform of the receiving path. In this example, seven sample points represent one path. If more sample points are used to represent a path, the number of inequalities used for determining the existence of a distortion may be increased, and if less sample points are used, the number of necessary inequalities may be decreased. According to another embodiment, it can be made either that a distortion is detected only when all of the inequalities are satisfied or that no distortion is detected when a specific one of the inequalities is satisfied. Further, according to the present embodiment, the distortion detection is performed by using the smallest one from the ratios of peak point p(N) to p(N+m) or p(N−m), but, according to another embodiment, the largest ratio may be used for distortion detection. In this case, it is determined whether a distortion of the path waveform has occurred on the steep slope side of the correlation profile.

Figure 10:
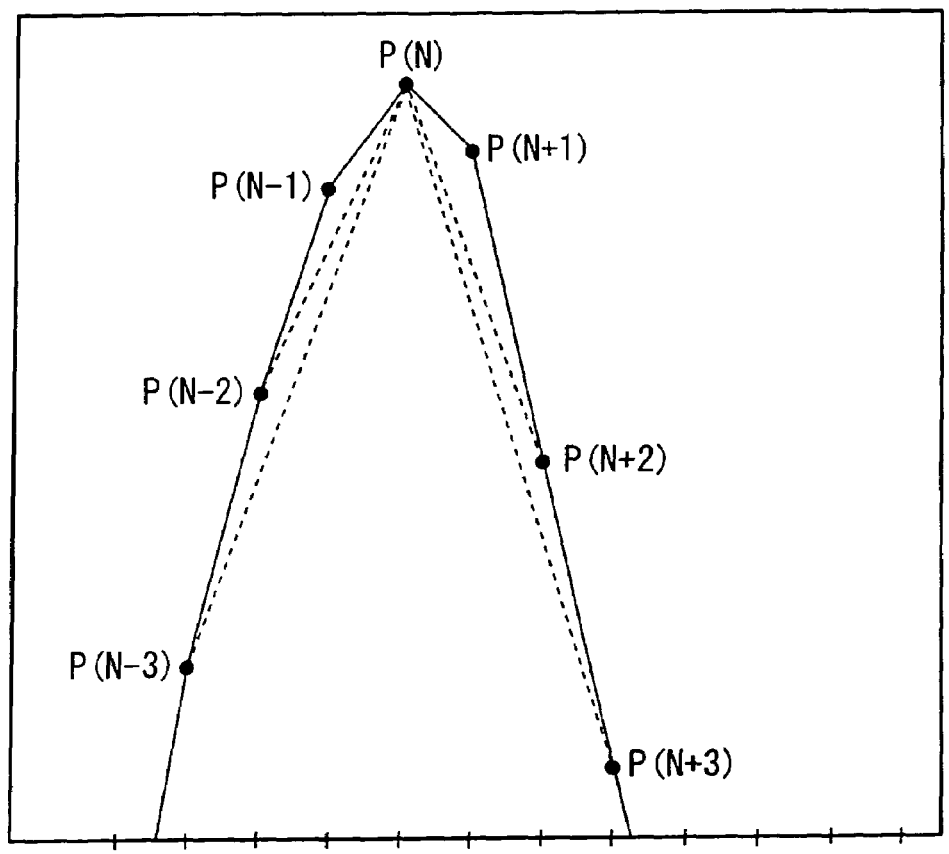
FIG. 10 is a graph of a delay profile showing relations among a peak correlation value p(N) and each of the correlation values of a receiving path.

FIG. 10 is a diagram of a delay profile showing relations among a peak correlation value p(N) and each of the correlation values of a receiving path. In this example, it is shown that p(N+1)>p(N−1), p(N−2)>p(N+2) and p(N−3)>p(N+3). Therefore, based on the inequalities (6), (7) and (8), if at least one of the following inequalities $$p(N) >= p(N+1) \times \alpha1$$

$$p(N) >= p(N-2) \times \alpha2$$

$$p(N) >= p(N-3) \times \alpha3$$

is satisfied, this path is recognized as a valid receiving path for demodulation. According to the present embodiment, p(N) is not necessarily larger than the path recognition threshold value. The fact that at least one of the above inequalities is satisfied is enough to the recognition of a valid receiving path. According to another embodiment, if there are many receiving paths having respective peak correlation values larger than the path recognition threshold value, it is possible to select a most appropriate path for demodulating received signals from the paths of enough peak correlation values by detecting distortions on path waveforms of correlation profiles of those paths.

While the present embodiment is described based on the ratios of the peak correlation value p(N) to other correlation values, as referred by the above equation (3), the ratios of p(N) to other correlation values may be converted into slope values from the peak point p(N) to other sample points in the correlation profile waveform. Therefore, according to another embodiment, based on the differences of correlation values, it is possible to recognize a valid receiving path for demodulation by detecting a distortion on a path waveform of a correlation profile.

While, according to the present embodiment, the distortion on a path waveform is detected by using the ratios of the peak value p(N) to the correlation values other than the peak value, it is also possible to detect a distortion on a path waveform by using ratios among correlation values other than the peak correlation value. For example, the ratios between neighboring correlation values or the ratios between every second or third correlation values may be used for detecting a distortion on a path waveform.

In a case where the ratios between neighboring correlation values are used for determining a distortion on a path waveform, inequalities are given as follows;

$$MIN[p(N)/p(N+1), p(N)/p(N-1)] >= \beta 1$$

$$MIN[p(N+1)/p(N+2), p(N-1)/p(N-2)] >= \beta 2$$

$$MIN[p(N+2)/p(N+3), p(N-2)/p(N-3)] >= \beta 3$$

Here, MIN[x, y] is a function having a value of the smallest one from the values of x and y. In this case, the smallest one from the values of $p(N+m)/p(N+m+1)$ and $p(N-m)/p(N-m-1)$ is used for detecting a distortion on a path waveform, and it is determined whether the distortion has occurred on the slow slope side of the correlation profile. The comparison threshold values $\beta 1$, $\beta 2$ and $\beta 3$ are respectively provided for each of the ratios of the above inequalities. The comparison threshold values and the ratios between the neighboring correlation values are compared to determine the existence of a distortion on a path waveform.

According to this embodiment, if at least one of the above inequalities is satisfied, it is determined that no distortion has occurred to this path, and this path is recognized as a valid receiving path for demodulation. To the contrary, if none of the above inequalities is satisfied, it is determined that a distortion has occurred to this path.

Figure 11:
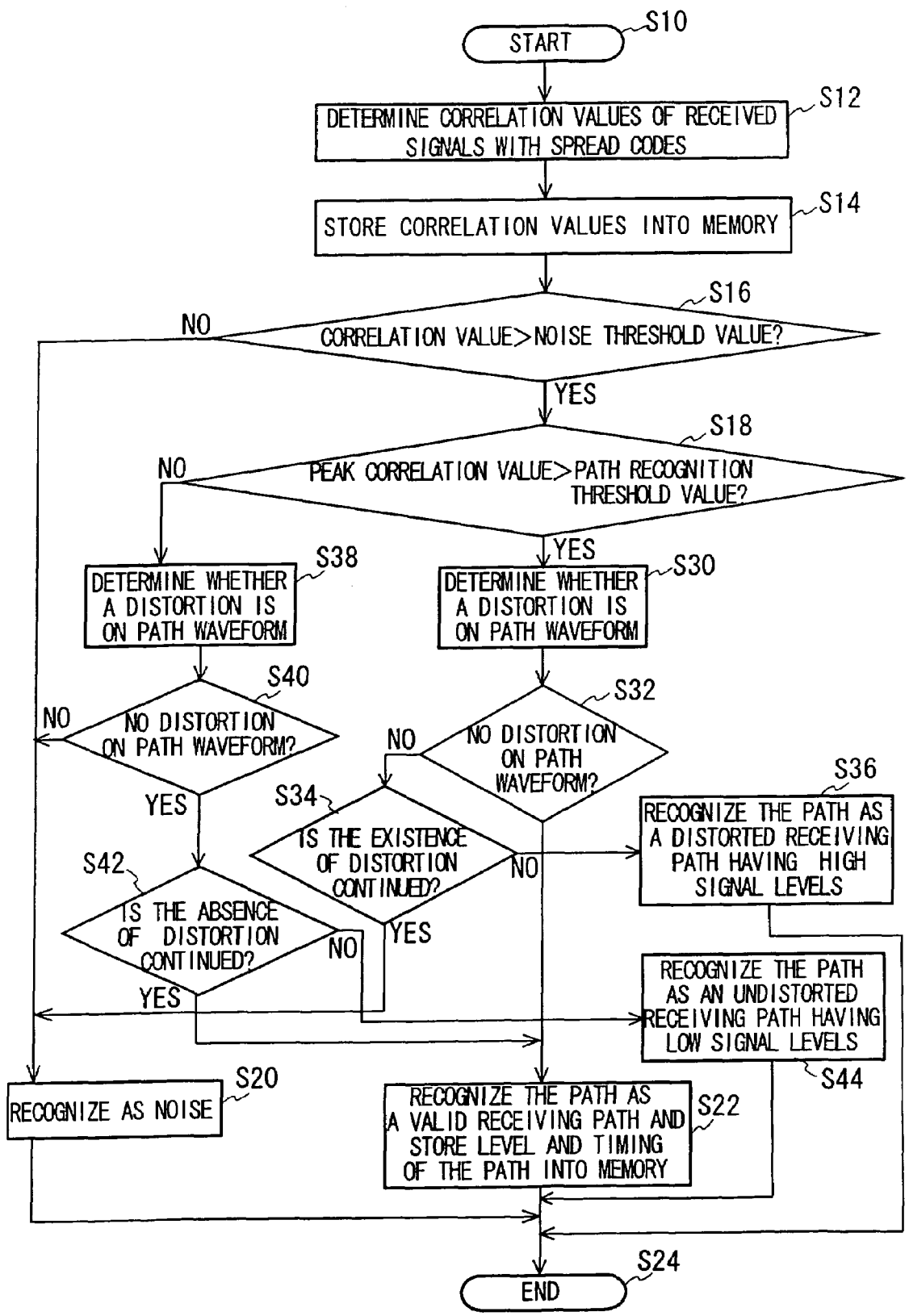
FIG. 11 is a flowchart showing process steps for an embodiment of a method for recognizing a valid receiving path according to the present invention.

FIG. 11 is a flowchart showing process steps for an embodiment of a method for recognizing a valid receiving path according to the present invention. At step S10, the path recognizing process starts. At step S12, correlation values between a set of received signals and a plurality of phase-shifted spread codes are acquired at a predetermined sampling rate. At step S14, the correlation values are stored into the memory. At step S16, the correlation values are compared with a predetermined noise threshold value. If a correlation value is smaller than the noise threshold value, at step S20 the set of signals having that correlation value at that delay time is recognized as noise. If the correlation values are larger than the noise threshold value, at step S18 a peak value of a correlation profile comprising a plurality of correlation values is compared with the path recognition threshold value.

If the peak correlation value is larger than the path recognition threshold value, at step S30 it is determined whether a waveform distortion has occurred based on the correlation profile. According to the determination of the step S30, at step S32 it is determined whether the receiving path represented as the path waveform has any distortion. If it is determined that the receiving path has no distortion, at step S22 the receiving path is recognized as a valid receiving path for demodulating received signals, and the signal level and timing of the receiving path are stored in the memory. If, however, it is determined that the receiving path has a distortion, at step S34 it is further determined whether the existence of distortion is continued from the last cycle of performing the path recognizing process of this embodiment. If it is determined that the existence of distortion is continued from the last cycle performing the path recognizing process, in other words, that the receiving path is determined to have a distortion at both the last and present cycles, at step S20 the receiving path is recognized as a path having noise. If, however, it is determined that the receiving path has a distortion at the present cycle, but did not have any distortion at the last cycle, in other words, that the existence of distortion is not continued, at step S36 the receiving path is recognized as a distorted receiving path having high signal levels. This path may be used as, for example, a candidate for valid receiving paths when the mobile station is in the waiting mode. Further, it may be possible to use this path for reevaluation for recognition as a valid receiving path by determining the received signal levels and distortions at the next cycle of performing this process.

At the step S18, if the peak correlation value is smaller than the path recognition threshold value, at step S38 it is further determined whether a waveform distortion has occurred based on the correlation profile. According to the determination of the step S38, at step S40 it is further determined whether the receiving path represented as the path waveform has any distortion. If it is determined that the receiving path has a distortion, at step S20 the receiving path is recognized as a path having noise. If, however, it is determined that the receiving path has no distortion, at step S42 it is further determined whether the absence of distortion is continued from the last cycle of performing this process. If it is determined that the absence of distortion is continued from the last cycle, in other words, that the receiving path is determined to have no distortion at both the last and present cycles, the receiving path is recognized as a valid receiving path for demodulating received signals, and the signal level and timing of the receiving path are stored in the memory at the step S22, If, however, it is determined that the receiving path has no distortion at the present cycle but had a distortion at the last cycle, in other words, that the absence of distortion is not continued, at step S44 the receiving path is recognized as an undistorted receiving path having low signal levels. Later, this path may be recognized as a valid receiving path by determining the received signal levels and the waveform distortions at the next cycle of performing this process. At step S24, the path recognizing process ends.

Figure 12:
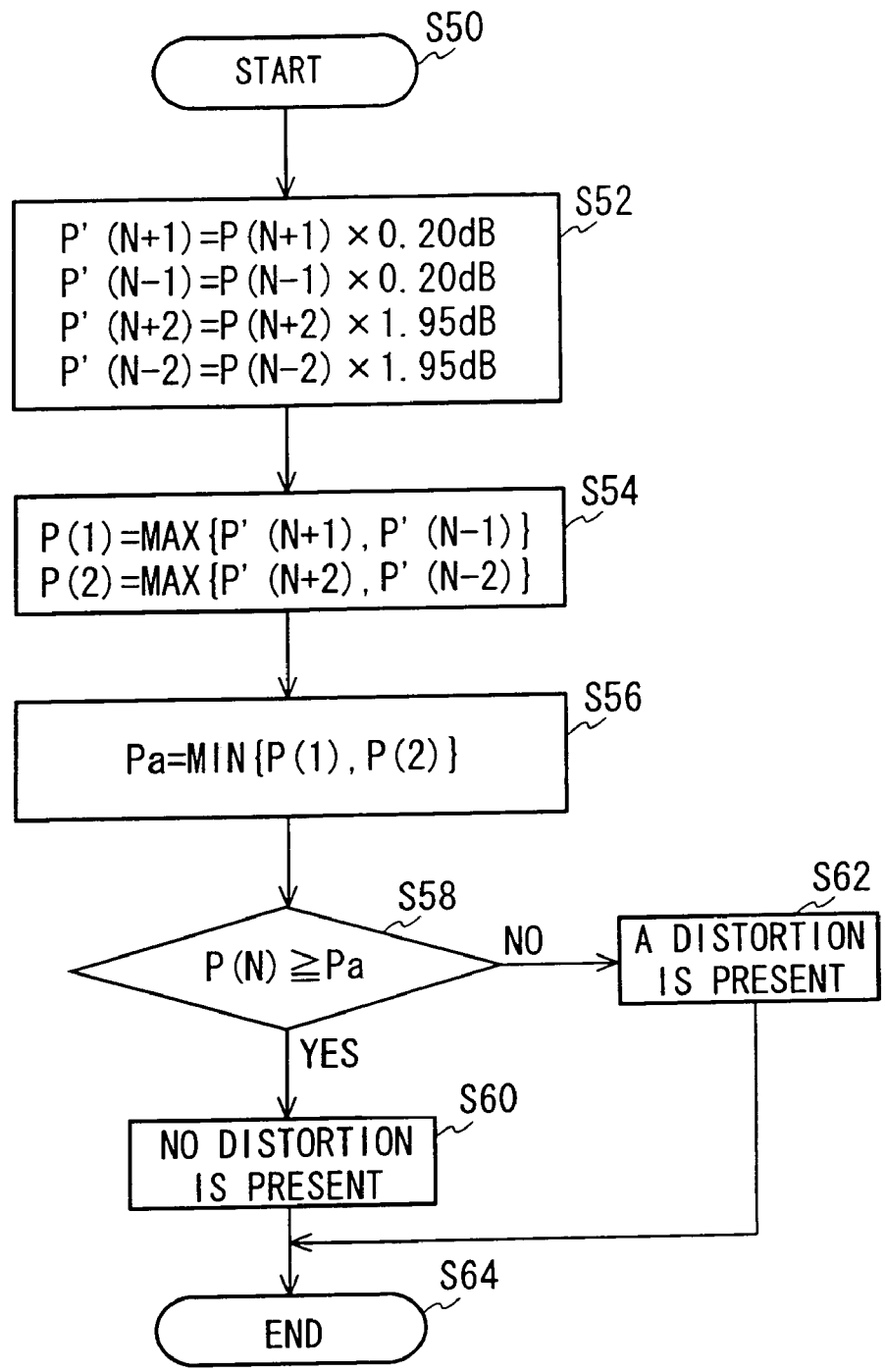
FIG. 12 is a flowchart showing an embodiment of a distortion determination process according to the present invention.

FIG. 12 is a flowchart showing an embodiment of a distortion determination process according to the present invention. The distortion determination process starts at step S50. At step S52, a correlation value is multiplied by a comparison threshold value. According to the present embodiment, in order to detect a distortion on a path waveform by using a correlation profile, a peak correlation value p(N) and additional four correlation values, other than the peak correlation value p(N), are used. The first comparison threshold value $\alpha 1$ is 0.20 dB for the ratios of p(N) to p(N+1) and p(N-1). The second comparison threshold value $\alpha 2$ is 1.95 dB for the ratios of p(N) to p(N+2) and p(N-2). The results of multiplications are as follows;

$$p'(N+1) = p(N+1) \times 0.20 \ dB$$

$$p'(N-1) = p(N-1) \times 0.20 \ dB$$

$$p'(N+2) = p(N+2) \times 1.95 \ dB$$

$$p'(N-2) = p(N-2) \times 1.95 \ dB$$

At step S54, P(1) represents the largest one from the values of p'(N+1) and p'(N-1), and P(2) represents the largest one from the values of p'(N+2) and p(N-2). At step S56, $P_a$ represents the smallest one from the values of P(1) and P(2).

At step S58, the peak correlation value p(N) is compared with $P_a$. If $P_a$ is smaller than p(N), at step S62 it is determined that the path has a distortion on the path waveform. If $P_a$ is equal to or larger than p(N), at step S60 it is determined that the path has no distortion. The distortion determination process ends at step S64.

Figure 13:
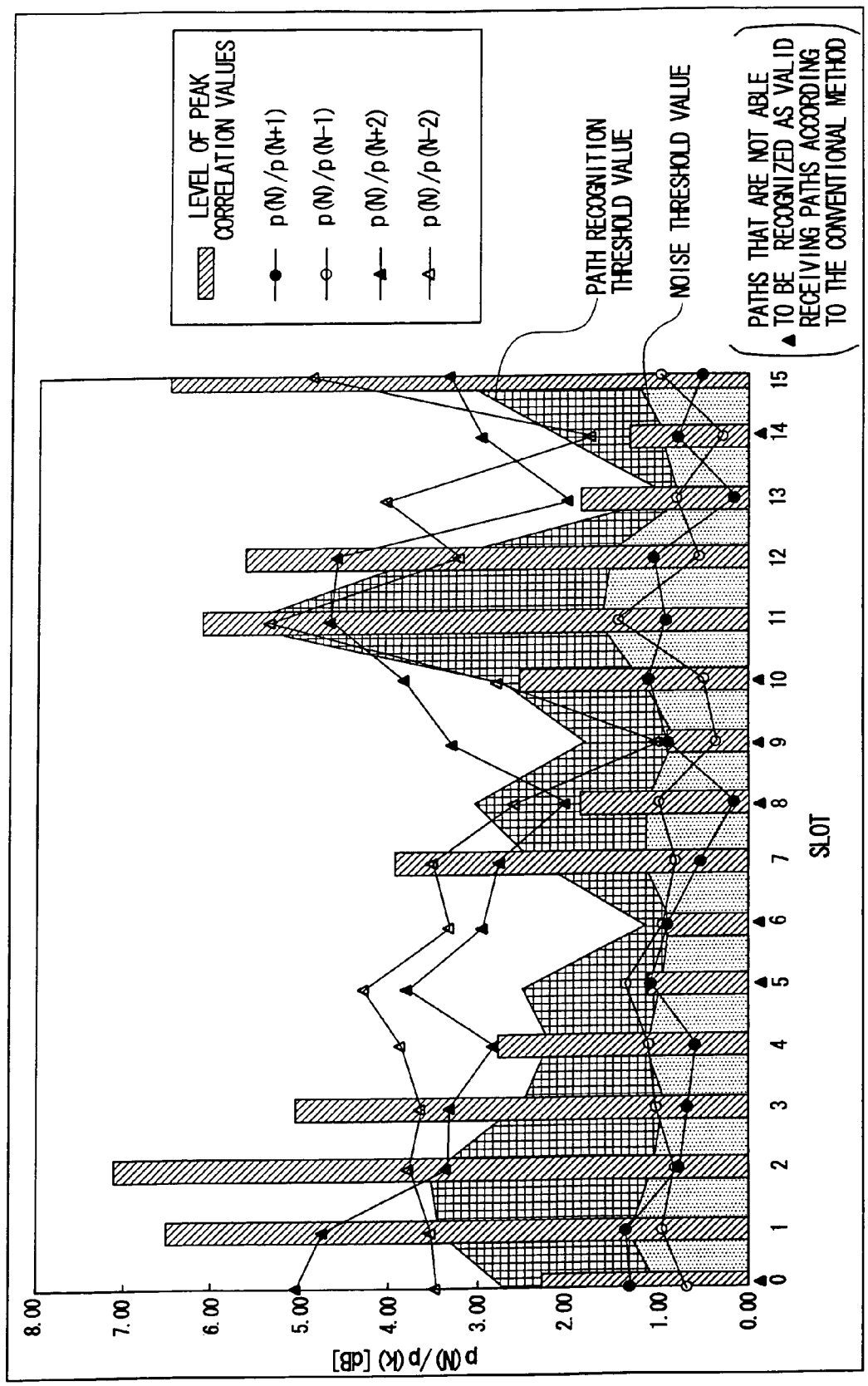
FIG. 13 is a graph showing a simulation result of a path evaluation performed on paths of consecutive 16 time slots.

FIG. 13 is a graph showing a simulation result of a path evaluation performed on paths of consecutive 16 time slots. In this simulation, in order to detect a distortion on a path waveform of a correlation profile, the distortion determination process described above with reference to FIG. 12 is used. In the graph of FIG. 13, a bar represents a level of a peak correlation value of a path. As shown, the levels or peak correlation values of the paths at time slots 0, 5, 6, 8, 9, 10 and 14 are smaller than the peak recognition threshold values. Therefore, according to the conventional path recognizing method, the paths at those time slots are treated as noise and eventually lost.

According to an embodiment of the present invention, even when a peak correlation value of a path is smaller than the path recognition threshold value, the path can be recognized as a valid receiving path for demodulation by detecting a distortion on a path waveform of a correlation profile based on the ratios of peak correlation value to other correlation values. In the simulation result shown in FIG. 13, the paths at the time slots 0, 5, 6, 8, 9, 10 and 14 are recognized as valid receiving paths for demodulation. Therefore, a very stable communication is achieved by recognizing all the paths on consecutive 16 time slots as valid receiving paths.

Therefore, according to the present invention, a stable and excellent path recognition method is achieved in a CDMA telecommunication system.

In describing the invention, reference has been made to preferred embodiments and illustrative advantages of the invention. Those skilled in the art, however, and familiar with the instant disclosure of the subject invention may recognize various modifications, additions, deletions, substitutions, and other changes that fall within the purview of the subject invention.

What is claimed is:

1. A method for recognizing a valid receiving path for demodulating received signals out of a plurality of receiving paths in a CDMA wireless telecommunication system, comprising the steps of:
   receiving at least one set of signals through a transmission path, said set of signals including a predetermined number of received signals;
   generating at least two spread codes each of which has its own delay time, said spread codes including a predetermined number of spread code bits;
   calculating at least two correlation values of said set of signals with said at least two spread codes, one of said at least two correlation values being a peak correlation value;
   forming a path waveform of said path according to a correlation profile based on said at least two correlation values;
   comparing said at least two correlation values with a predetermined noise threshold value;
   recognizing said path as a noise when one of said at least two correlation values is smaller than said predetermined noise threshold value;
   comparing said peak correlation value with a predetermined path recognition threshold value;
   determining whether there is a distortion on said path waveform according to a correlation profile based on a ratio of said peak correlation value to at least one of said at least two correlation values other than said peak correlation value; and
   recognizing said path as a valid receiving path for demodulating said received signals based on the results of determination of said determining step.

2. A method according to claim 1, wherein said step of recognizing said path as a valid receiving path is a step of recognizing said path as a valid receiving path for demodulating said received path when it is determined that there is no distortion on said path waveform.

3. A CDMA wireless telecommunication mobile station for receiving a set of telecommunication signals through a telecommunication path from a base station comprising:
   a spread code generator for generating at least two spread codes each of which has its own delay time, said spread codes including a predetermined number of spread code bits;
   a correlator for calculating at least two correlation values of said set of signals with said at least two spread codes;
   a comparator for comparing said correlation values with a predetermined noise threshold value and comparing a peak correlation value with a predetermined path recognition threshold value;
   a waveform distortion detector for determining whether there is a distortion on a path waveform of said path represented as a correlation profile, said correlation profile being formed based on said at least two correlation values and a plurality of ratios of a plurality of respectively neighboring correlation values; and
   a path recognizing unit for recognizing said path as a valid receiving path for demodulating said received signals based on said at least two correlation values or recognizing said path as a noise when one of said path correlation value is smaller than said predetermined noise threshold value.

4. A CDMA wireless telecommunication mobile station according to claim 3, wherein said at least two correlation values are said peak correlation value and a correlation value other than said peak correlation value.

5. A CDMA wireless telecommunication mobile station according to claim 4, wherein said waveform distortion detector determines whether there is a distortion on said path waveform of said path according to a correlation profile based on a ratio of said peak correlation value to a plurality of correlation values other than said peak correlation value.

6. A CDMA wireless telecommunication system comprising a mobile station for receiving a set of telecommunication signals through a telecommunication path from a base station, said mobile station comprising:
   a spread code generator for generating at least two spread codes each of which has its own delay time, said spread codes including a predetermined number of spread code bits;
   a correlator for calculating at least two correlation values of said set of signals with said at least two spread codes;
   a comparator for comparing said correlation values with a predetermined noise threshold value, and comparing a peak correlation value with a predetermined path recognition threshold value;
   a waveform distortion detector for determining whether there is a distortion on a path waveform of said path according to a correlation profile, said correlation profile being formed based on said at least two correlation values and a ratio of said peak correlation value to a plurality of correlation values other than said peak correlation value; and
   a path recognizing unit for recognizing said path as a valid receiving path for demodulating said received signals based on said at least two correlation values or recognizing said path as a noise when one of said peak correlation values is smaller than said predetermined noise threshold value.

7. A CDMA wireless telecommunication system comprising a mobile station for receiving a set of telecommunication signals through a telecommunication path from a base station, said mobile station comprising:
- a spread code generator for generating at least two spread codes each of which has its own delay time, said spread codes including a predetermined number of spread code bits;
- a correlator for calculating at least two correlation values of said set of signals with said at least two spread codes;
- a comparator for comparing said correlation values with a predetermined noise threshold value, and comparing a peak correlation value with a predetermined path recognition threshold value;
- a waveform distortion detector for determining whether there is a distortion on a Path waveform of said path according to a correlation profile, said correlation profile being formed based on the existence of said distortion on said path waveform of said path according to a slope derived from said two correlation values; and
- a path recognizing unit for recognizing said path as a valid receiving path for demodulating said received signals based on said at least two correlation values or recognizing said path as a noise when one of said peak correlation values is smaller than said predetermined noise threshold value.

8. A method according to claim 2, further comprising the step of determining whether there is a distortion on said path waveform when said peak correlation value is smaller than said path recognition threshold value; and
- wherein said path recognizing step further recognizes said path as a valid receiving path when said peak correlation value is smaller than said path recognition threshold value and when said step of determining the existence of the distortion when said peak correlation value is smaller than said path recognition threshold value determines that there is no distortion on said waveform; and
- wherein said path recognizing step further recognizes said path as a noise when said step of determining the existence of the distortion when said peak correlation value is smaller than said path recognition threshold value determines that there is a distortion.

9. A method according to claim 8, further comprising the step of storing said path to a memory to use for reevaluation after at least one of said determining steps,
- wherein at least one of said determining steps comprises a step of determining whether the distortion is continued from the last cycle of said step of recognizing said path as a valid receiving path according to said stored path.

10. A method according to claim 9, wherein said step of determining whether there is a distortion on said path waveform comprises a step of determining whether the existence of the distortion is continued from the last cycle of said step of recognizing said path as a valid receiving path according to said stored path;
- said recognizing step further recognizes said path as a noise when said determining step determines that the existence of the distortion is continued from the last cycle; and
- said path storing step further comprising a step of storing said path as a distorted receiving path having high signal level when said determining step determines that the existence of the distortion is not continued from the last cycle.

11. A method according to claim 9, wherein said determining step comprises a step of determining whether the absence of the distortion is continued from the last cycle of said step of recognizing said path as a valid receiving path according to said stored path;
- said path recognizing step further recognizes said path as a valid receiving path when said determining step determines that the absence of the distortion is continued from the last cycle; and
- said path storing step further comprises the step of storing said path as an undistorted receiving path having low signal levels when said determining step determines that the absence of the distortion is not continued from the last cycle.

12. A CDMA wireless telecommunication mobile station according to claim 3, wherein said waveform distortion detector determines whether there is a distortion on said path waveform when said peak correlation value is smaller than said path recognition threshold value; and
- wherein said path recognizing unit recognizes said path as a valid receiving path when said peak correlation value is smaller than said path recognition threshold value and when said waveform detector determines that there is no distortion on said waveform and recognizes said path as a noise when said waveform detector determines that there is a distortion.

13. A CDMA wireless telecommunication mobile station according to claim 12, further comprising a memory for storing said path for reevaluation,
- wherein said waveform distortion detector determines whether the distortion is continued from the last cycle of said path as a valid receiving path according to said path stored in said memory.

14. A CDMA wireless telecommunication mobile station according to claim 13, wherein said waveform distortion detector determines whether the existence of the distortion is continued from the last cycle of said path as the valid receiving path according to said path stored in said memory;
- wherein said path recognizing unit recognizes said path as a noise when said waveform distortion detector determines that the existence of the distortion is continued from the last cycle; and
- wherein said memory stores said path as a distorted receiving path having high signal level when said waveform distortion detector determines that the existence of the distortion is not continued from the last cycle.

15. A CDMA wireless telecommunication mobile station according to claim 13, wherein said waveform distortion detector determines whether the absence of the distortion is continued from the last cycle of said path as the valid receiving path according to said path stored in said memory;
- wherein said path recognizing unit recognizes said path as a valid receiving path when said waveform distortion detector determines that the absence of the distortion is continued from the last cycle; and
- wherein said memory stores said path as an undistorted receiving path having low signal levels when said waveform distortion detector determines that the absence of the distortion is not continued from the last cycle.

16. A CDMA wireless telecommunication mobile system according to claim 6, wherein said waveform distortion detector determines whether there is a distortion on said path waveform when said peak correlation value is smaller than said path recognition threshold value; and wherein said path recognizing unit recognizes said path as a valid receiving path when said peak correlation value is smaller than said path recognition threshold value and when said waveform detector determines that there is no distortion on said waveform and recognizes said path as a noise when said waveform detector determines that there is a distortion.

17. A CDMA wireless telecommunication mobile system according to claim 16, further comprising a memory for storing said path for reevaluation,
wherein said waveform distortion detector determines whether the distortion is continued from the last cycle of said path as a valid receiving path according to said path stored in said memory.

18. A CDMA wireless telecommunication mobile system according to claim 17, wherein said waveform distortion detector determines whether the existence of the distortion is continued from the last cycle of said path as the valid receiving path according to said path stored in said memory;
wherein said path recognizing unit recognizes said path as a noise when said waveform distortion detector determines that the existence of the distortion is continued from the last cycle; and
wherein said memory stores said path as a distorted receiving path having high signal level when said waveform distortion detector determines that the existence of the distortion is not continued from the last cycle.

19. A CDMA wireless telecommunication mobile system according to claim 17, wherein said waveform distortion detector determines whether the existence of the distortion is continued from the last cycle of said path as the valid receiving path according to said path stored in said memory;
wherein said path recognizing unit recognizes said path as a valid receiving path when said waveform distortion detector determines that the absence of the distortion is continued from the last cycle; and
wherein said memory stores said path as an undistorted receiving path having low signal levels when said waveform distortion detector determines that the absence of the distortion is not continued from the last cycle.

20. A base band signal processor for receiving a set of telecommunication signals through a telecommunication path comprising:
a spread code generator for generating at least two spread codes each of which has its own delay time, said spread codes including a predetermined number of spread code bits;
a correlator for calculating at least two correlation values of said set of signals with said at least two spread codes;
a comparator for comparing said correlation values with a predetermined noise threshold value, and comparing a peak correlation value with a predetermined path recognition threshold value;
a waveform distortion detector for determining whether there is a distortion on a path waveform of said path according to a correlation profile, said correlation profile being formed based on said at least two correlation profile values and a ratio of said peak correlation value to a plurality of correlation values other than said peak correlation value; and
a path recognizing unit for recognizing said path as a valid receiving path for demodulating said received signals based on said at least two correlation values or recognizing said path as a noise when one of said peak correlation values is smaller than said predetermined noise threshold value.

21. A base band signal processor for receiving a set of telecommunication signals through a telecommunication path comprising:
a spread code generator for generating at least two spread codes each of which has its own delay time, said spread codes including a predetermined number of spread code bits;
a correlator for calculating at least two correlation values of said set of signals with said at least two spread codes;
a comparator for comparing said correlation values with a predetermined noise threshold value, and comparing a peak correlation value with a predetermined path recognition threshold value;
a waveform distortion detector for determining whether there is a distortion on a path waveform of said path according to a correlation profile, said correlation profile being formed based on the existence of said distortion on said path waveform of said path according to a slope derived from said two correlation values; and
a path recognizing unit for recognizing said path as a valid receiving oath for demodulating said received signals based on said at least two correlation values or recognizing said path as a noise when one of said peak correlation values is smaller than said predetermined noise threshold value.

22. A base band signal processor according to claim 20, wherein said waveform distortion detector determines whether there is a distortion on said path waveform when said peak correlation value is smaller than said path recognition threshold value; and
wherein said path recognizing unit recognizes said path as a valid receiving path when said peak correlation value is smaller than said path recognition threshold value and when said waveform detector determines that there is no distortion on said waveform and recognizes said path as a noise when said waveform detector determines that there is a distortion.

23. A base band signal processor according to claim 22, further comprising a memory for storing said path for reevaluation after at least one of said determining steps,
wherein said waveform distortion detector determines whether the distortion is continued from the last cycle of said path as a valid receiving path according to said path stored in said memory.

24. A base band signal processor according to claim 23, wherein said waveform distortion detector determines whether the existence of the distortion is continued from the last cycle of said path as the valid receiving path according to said path stored in said memory;
wherein said path recognizing unit recognizes said path as a noise when said waveform distortion detector determines that the existence of the distortion is continued form the last cycle; and
wherein said memory stores said path as a distorted receiving path having high signal level when said waveform distortion detector determines that the existence of the distortion is not continued from the last cycle.

25. A base band signal processor according to claim 23, wherein said waveform distortion detector determines whether the existence of the distortion is continued from the last cycle of said path as the valid receiving path according to said path stored in said memory;

wherein said path recognizing unit recognizes said path as a valid receiving path when said waveform distortion detector determines that the absence of the distortion is continued from the last cycle; and wherein said memory stores said path as an undistorted receiving path having low signal levels when said waveform distortion detector determines that the absence of the distortion is not continued from the last cycle.

26. A CDMA wireless telecommunication system for communicating a set of telecommunication signals through a telecommunication path between a mobile station and a base station, comprising:

a spread code generator for generating at least two spread codes each of which has its own delay time, said spread codes including a predetermined number of spread code bits;

a correlator for calculating at least two correlation values of said sets of signals with said at least two spread codes;

a comparator for comparing said correlation values with a predetermined noise threshold value, and comparing a peak correlation value with a predetermined path recognition value;

a waveform distortion detector for determining whether there is a distortion on a path waveform of said path according to a correlation profile, said correlation profile being formed based on a ratio of said peak correlation value to at least one of said at least two correlation values other than said peak correlation value; and a path recognizing unit for recognizing said path as a valid receiving path for demodulating said received signals based on said at least two correlation values or recognizing said path as a noise when one of said peak correlation values is smaller than said predetermined noise threshold value.

* * * * *